Patented Oct. 3, 1950

2,524,072

UNITED STATES PATENT OFFICE 2,524,072

DYEING ORGANIC DERIVATIVE OF CELLULOSE TEXTILE MATERIAL WITH AN AQUEOUS SOLUTION COMPRISING A LEUCO VAT DYE, A WATER-MISCIBLE ORGANIC BASE, AND DIACETONE ALCOHOL

Henry Charles Olpin and Edmund Stanley, Spondon, near Derby, England, assignors to Celanese Corporation of America, a corporation of Delaware No Drawing. Application July 10, 1948, Serial No. 38,172. In Great Britain July 28, 1947

5 Claims. (Cl. 8—36)

This invention relates to the colouring of textile materials and is more particularly concerned with the colouring, with vat dyes, of textile material of cellulose acetate or other organic derivative of cellulose, that is of another cellulose ester of an organic acid or of a cellulose ether.

As is well known, very valuable dyeings can be produced on cellulose fibres with the aid of vat dyes and in particular dyeings which are of extremely good fastness both to light and to washing. Nevertheless the vat dyes have not been employed on any extensive scale for the colouration of cellulose acetate fibres. This is more particularly the case with the class of vat dyes containing two or more anthracene nuclei in the molecule, which class includes many vat dyes of the very greatest value on account of the extremely high resistance of their dyeings to the action of light and other agencies, particularly washing.

This lack of use of vat dyes for the colouring of cellulose acetate textile materials is due to the fact that the material cannot be dyed with vat dyes by the well-known and easily practised alkaline vat technique as commonly used for cellulose fibres, at least if the cellulose acetate is to remain substantially unsaponified and is to be permeated by the dye so that the latter resists removal by rubbing.

We have now devised a method whereby a wide range of vat dyes, including vat dyes containing two or more anthracene nuclei, can be satisfactorily applied to cellulose acetate fibres without material saponification of the latter and in such a way that the dye permeates the substance of the fibres. In our new process the vat dye is applied to the cellulose acetate fibres in the form of a leuco compound in an aqueous medium containing an organic base and which has a substantial swelling action on the cellulose acetate. Swelling of cellulose acetate fibres is usually accompanied by a shrinkage in the direction of their length, providing that the fibres are not under restraint. Indeed the liquid medium containing the leuco compound of the dye may be such as to shrink cellulose acetate fibres by 10%, 15%, 20% or more of their length if they are immersed therein for 5 minutes under little or no restraint. On the other hand, for some purposes the medium may advantageously be such as does not substantially shrink cellulose acetate fibre under the said conditions.

The desired swelling action of the dye liquid can be ensured by the use of a suitable organic base in appropriate proportion or by the use of an organic base in conjunction with another water-miscible organic liquid. In the case of using an organic base alone, the latter should be miscible with water in the proportions required to impart to the dye liquid the desired strong swelling action on cellulose acetate. Pyridine has been found to be a particularly suitable organic base for the purpose. It may be employed in the proportion of 15–25% based on the combined weight of the organic base and water in the dye liquid. Other organic bases which can be employed are the methyl and other alkyl pyridines, piperidine and its N-alkyl derivatives, piperazine and its N-alkyl derivatives, cyclo-hexylamine and its N-alkyl derivatives, benzylamine, ethylene diamine, and N-diethyl-ethylene diamine. The base can be either primary, secondary or tertiary.

Hydroxy-alkylamines, for example mono-, di- and tri-ethanolamine and the corresponding propanolamines, likewise the quaternary ammonium bases, are less suitable than are the above bases when the organic base constitutes the sole agent present capable of imparting swelling properties to the dye liquid. Nevertheless, these organic bases, and also the above mentioned organic bases, likewise organic bases which are difficultly soluble in water, can be used when the dye liquid contains another water-miscible organic liquid capable of swelling cellulose acetate when in aqueous solution.

When employing the organic base as the sole constituent imparting swelling properties for cellulose acetate to the dye liquid, the preparation of the dye liquid can be readily effected by vatting the dye with sodium hydrosulphite and the remaining components of the dye liquid, namely the organic base and water. When a water-miscible organic liquid other than the organic base is to be used, it is preferred to add this to the dye liquid after vatting the dye with sodium hydrosulphite, organic base and water as indicated above.

When a water-miscible organic liquid other than an organic base is employed in the dye liquid, it is advantageously a polar compound and is preferably aliphatic; in the undiluted state it can be a solvent for cellulose acetate; it may be a hydroxy compound, a ketone, an ester, an ether or a halogen compound. The best results, both from the point of view of the character of the dyeings obtained and the stability of the dye liquid, seem to result from the use of compounds containing two groups or atoms of the kind commonly referred to as polar. Especial mention may be made of compounds containing a hydroxy group and a polar group or atom of another kind, for example the ketone group—CO—, an ester group— COO—, an ether oxygen—O—, or a halogen atom. Diacetone alcohol has been found to be particularly suitable for the purpose. Other compounds which may be used are partial carboxylic esters of aliphatic di- or polyhydric alcohols, for example glycol monoacetate or glycerol mono- or di-acetate; partial ethers of aliphatic di- or poly-hydric alcohols, for example glycol mono-methyl ether or glycol monoethyl ether; esters of hydroxy carboxylic acids, for example ethyl lactate; halogen hydrins, for example ethylene chlorhydrin; and water-miscible ethers, for example ethylene-methylene-ether or tetramethylene oxide. An example of a suitable compound which contains two polar groups but no hydroxy group is glycol monomethyl ether acetate.

Water-miscible aliphatic mono-alcohols, for example methyl alcohol, ethyl alcohol, propyl alcohols, or butyl alcohols, can be employed although, when they are used in sufficient proportion to impart to the dye liquid the desirable strong swelling action on the cellulose acetate fibres, the stability of the dye liquid is not always so good as when diacetone alcohol or other liquid containing at least two polar groups is employed.

If desired, inorganic substances, of which aqueous solutions are capable of swelling cellulose acetate fibres, may be included in the dye liquid, for example sodium, potassium, ammonium, zinc or other thiocyanate.

Dispersing agents and/or wetting agents may be included in the dye liquids, and their inclusion frequently results in a useful increase in the stability of the dye bath. Again, a formaldehyde sulphoxylate may advantageously be included in the dye liquids, particularly if the latter are to be applied at high temperatures, for example 50° C. or over.

The proportion by weight of organic base or of organic base and other water-miscible organic liquid employed depends upon the particular liquid or liquids used and the method of using the dye liquid. When the liquids are such as to yield with water mixtures which dissolve cellulose acetate, the proportion used may approach fairly closely, but of course should not reach, that which would make the dye liquid a solvent for cellulose acetate. However, much lower proportions can be used. The invention particularly contemplates the use of dye liquids containing water and in which the latter constitutes a substantial proportion of the liquid content of the dye medium, for example at least 20%, and preferably at least 30% or 40%.

The lower proportions of organic base or of organic base and other water-miscible organic liquid employed, that is proportions such that the dye liquid exerts but a moderate degree of swelling on cellulose acetate, are more particularly useful when it is desired that the cellulose acetate material should take up the dye substantively from the dye liquid. To this end the dye liquid may advantageously contain from 15% to 20% of diacetone alcohol and from 5% to 10% of pyridine, the diacetone alcohol and pyridine together not exceeding about 25% based on the weight of the diacetone alcohol, pyridine and water. Under these circumstances it is possible to obtain very good exhaustion of the dye from the dye liquid, and dyeing can be conducted in the conventional manner, that is by immersing the cellulose acetate material in the dye liquid and working it therein at, say, 50°-60° C. until the dye is substantially exhausted from the dye liquid.

The higher proportions of organic base or organic base and water-miscible organic liquid are of most value when the dye liquid is to be applied by mechanical impregnation methods, for example padding or printing, or by a short immersion followed by centrifuging. When using high proportions, for example those which lead to substantial shrinkage of cellulose acetate fibres, the vat dyes as a rule exhibit little or no substantive affinity for cellulose acetate material, the dye taken up being substantially only that in the liquid retained by the material. When mechanical impregnation methods such as padding, or other methods involving a relatively short time of passage of the material through the dye liquid are employed, care should be taken that the time of contact between material and dye liquid is not too short. From the point of view of obtaining a high degree of uniformity of colouration, the time of contact is advantageously in excess of one or two minutes, for example about five minutes.

For application by mechanical impregnation methods and especially for application by printing, the liquid may be thickened in any suitable way, for example with a water-soluble cellulose ether, e. g. methyl cellulose or hydroxyethyl cellulose.

The leuco compound on the cellulose acetate material may be oxidised to the parent vat dye in any convenient way, and preferably after washing the material to remove the organic base and/or other water-miscible organic liquid employed. Air oxidation may be used or the material may be subjected to the action of an aqueous solution of an oxidising agent, for example an aqueous solution of a perborate, an aqueous solution of hydrogen peroxide or an acidified aqueous solution of a chromate.

After the oxidation of the leuco vat dye to the parent dye on the material, the latter is advantageously given a hot soaping treatment, for example at 70°-80° C. or even at temperatures up to the boil, in order to ensure that the shade of the dye is properly developed. If desired a steaming treatment may be employed for this purpose in place of or in addition to the hot soapy treatment. Steaming frequently raises the fastness to light of the dyeing to a substantial extent.

The vat dyes which can be applied by the new process include, as already mentioned, dyes containing two or more anthracene nuclei, for example:

(a) dibenzanthrone and iso-dibenzanthrone and their halogen and alkoxy derivatives, e. g. dimethoxy-dibenzanthrone, halogenated dimethoxy-dibenzanthrone and halogenated iso-dibenzanthrone;

(b) indanthrone and halogen derivatives thereof;

(c) dyes obtained by ring closure of Bz-1-benzanthronyl-1-aminoanthraquinones;

(d) Anthraquinone carbazoles obtainable by ring closure of alpha-alpha'-di- and polyanthrimides with concentrated sulphuric acid, e. g. the dye obtainable by ring closure of 5:5'-dibenzoylamino-1:1'-dianthraquinonylamine.

Specific examples of commercial dyes which may be applied are:

Caledon Jade Green B,
Caledon Red X5B,
Caledon Brown G,
Caledon Brilliant Blue 3G.

The invention is illustrated by the following examples, the parts referred to being parts by weight:

Example 1

0.3 part of Caledon Jade Green B 300 powder is vatted with an equal weight of sodium hydrosulphite in a mixture of 10 parts pyridine with 40 parts of water. The temperature of the dye liquid is adjusted to about 20° C. and a woven cellulose acetate fabric immersed therein for about 5 minutes. The fabric is then lifted, washed in water and oxidised in hydrogen peroxide solution (5 cc. of 6% hydrogen peroxide litre) to convert the leuco compound back to the parent vat dye. The material is then given a short soaping and finally rinsed and dried. A medium bluish-green shade is thus obtained.

The other commercial dyes mentioned above may be applied in a similar way.

Example 2

0.6 part of Caledon Jade Green B 300 powder is vatted with 0.8 part of sodium hydrosulphite, 5 parts of pyridine, and 55 parts of water at about 50° C. To the cooled vat is added 40 parts of diacetone alcohol. After adjusting the temperature to 20–25° C. a cellulose acetate fabric is immersed in the resulting dye liquid for 5 minutes and then rinsed, oxidised, and soaped in the manner indicated in Example 1 with similar results.

Example 3

0.2 part of Caldon Jade Green B 300 powder is vatted with 0.3 part of sodium hydrosulphite, 2 parts of pyridine and 15 parts of water at about 50° C. To the vat is added a mixture of 15 parts of diacetone alcohol with 68 parts of water containing 0.2 part of sodium formaldehyde sulphoxylate. A cellulose acetate fabric (2.5 parts) is entered into the resulting dye liquid and dyed therein for one hour at 50 to 55° C. The material is then rinsed, oxidised, and soaped in the way described in Example 1. A bluish-green shade is obtained.

The process of the invention has been described more particularly with reference to the colouring of cellulose acetate fibres. It can, however, be applied for the colouration of fibres of other cellulose esters or of cellulose ethers and especially of cellulose esters of other lower fatty acids, for example cellulose propionate, cellulose aceto-propionate and cellulose aceto-butyrate.

Having described our invention, what we desire to secure by Letters Patent is:

1. Process for the coloration of textile material of an organic derivative of cellulose with a vat dye, which comprises subjecting the material to the action of a leuco compound of the vat dye in an aqueous medium containing a water-miscible organic base which is a swelling agent for the cellulose derivative and sufficient diacetone alcohol to impart to the aqueous medium a substantial swelling action on the cellulose derivative, and thereafter directly washing the material and oxidizing the leuco compound thereon to the parent vat dye.

2. Process for the coloration of textile material of cellulose acetate with a vat dye, which comprises subjecting the material to the action of a leuco compound of the vat dye in an aqueous medium containing a water-miscible organic base which is a swelling agent for the cellulose acetate and at least 15% of diacetone alcohol based on the liquid content of the aqueous medium and thereafter directly washing the material and oxidizing the leuco compound thereon to the parent vat dye.

3. Process for the coloration of cellulose acetate textile material with a vat dye, which comprises subjecting the material to the action of a leuco compound of the vat dye in an aqueous medium containing pyridine and diacetone alcohol, the proportions of pyridine and diacetone alcohol being sufficient to impart to the medium a substantial swelling action on the cellulose acetate, and thereafter directly washing the material and oxidizing the leuco compound thereon to the parent vat dye.

4. Process for the coloration of textile material of cellulose acetate with a vat dye, which comprises mechanically impregnating the material with an aqueous medium containing a leuco compound of the vat dye and about 5% of pyridine and about 40% of diacetone alcohol based on the weight of the liquid constituents of the medium, and thereafter directly washing the material and oxidizing the leuco compound thereon to the parent vat dye.

5. Process for the coloration of textile material of cellulose acetate with a vat dye, which comprises allowing the material to absorb substantively a leuco compound of the vat dye from an aqueous medium containing a leuco compound of the vat dye, about 2% of pyridine, and about 15% of diacetone alcohol based on the weight of the liquid constituents of the medium, and thereafter directly washing the material and oxidizing the leuco compound thereon to the parent vat dye.

HENRY CHARLES OLPIN.
EDMUND STANLEY.

REFERENCES CITED

The following references are of record in the file of this patent:

UNITED STATES PATENTS

| Number | Name | Date |
|---|---|---|
| 1,968,819 | Dreyfus | Aug. 7, 1934 |
| 1,968,855 | Rivat | Aug. 7, 1934 |
| 2,107,526 | Dreyfus | Feb. 8, 1938 |
| 2,182,963 | Dreyfus | Dec. 12, 1939 |

FOREIGN PATENTS

| Number | Country | Date |
|---|---|---|
| 479,867 | Great Britain | Feb. 14, 1938 |
| 847,107 | France | June 26, 1939 |